(12) United States Patent
Han et al.

(10) Patent No.: US 8,269,729 B2
(45) Date of Patent: Sep. 18, 2012

(54) METHODS OF INTERFACING WITH MULTI-POINT INPUT DEVICES AND MULTI-POINT INPUT SYSTEMS EMPLOYING INTERFACING TECHNIQUES

(75) Inventors: Jefferson Y. Han, Holliswood, NY (US); Philip L. Davidson, Bronx, NY (US)

(73) Assignee: Perceptive Pixel Inc., New York, NY (US)

( * ) Notice: Subject to any disclaimer, the term of this patent is extended or adjusted under 35 U.S.C. 154(b) by 1066 days.

(21) Appl. No.: 12/024,001

(22) Filed: Jan. 31, 2008

(65) Prior Publication Data

US 2008/0180404 A1 Jul. 31, 2008

Related U.S. Application Data

(60) Provisional application No. 60/887,489, filed on Jan. 31, 2007.

(51) Int. Cl.
*G06F 3/041* (2006.01)

(52) U.S. Cl. ........................................................ 345/173

(58) Field of Classification Search ................... 345/173
See application file for complete search history.

(56) References Cited

U.S. PATENT DOCUMENTS

| | | | |
|---|---|---|---|
| 3,200,701 A | 8/1965 | White | |
| 3,673,327 A | 6/1972 | Johnson et al. | |
| 3,846,826 A | 11/1974 | Mueller | |
| 4,121,129 A | 10/1978 | Maloney | |
| 4,134,063 A | 1/1979 | Nicol et al. | |
| 4,346,376 A | 8/1982 | Mallos | |
| 4,484,179 A | 11/1984 | Kasday | |
| 4,668,861 A | 5/1987 | White | |
| 5,483,261 A * | 1/1996 | Yasutake | 345/173 |
| 5,825,352 A * | 10/1998 | Bisset et al. | 345/173 |
| 6,323,846 B1 | 11/2001 | Westerman et al. | |
| 6,597,347 B1 * | 7/2003 | Yasutake | 345/173 |
| 7,030,861 B1 * | 4/2006 | Westerman et al. | 345/173 |
| 2002/0036618 A1 | 3/2002 | Wakai et al. | |
| 2002/0158838 A1 | 10/2002 | Smith et al. | |
| 2003/0128192 A1 | 7/2003 | van Os | |
| 2004/0164956 A1 | 8/2004 | Yamaguchi | |
| 2006/0026521 A1 | 2/2006 | Hotelling et al. | |
| 2006/0026535 A1 | 2/2006 | Hotelling et al. | |
| 2006/0026536 A1 * | 2/2006 | Hotelling et al. | 715/863 |
| 2006/0033724 A1 | 2/2006 | Chaudhri et al. | |
| 2006/0053387 A1 | 3/2006 | Ording | |
| 2006/0085757 A1 | 4/2006 | Andre et al. | |
| 2006/0161870 A1 | 7/2006 | Hotelling et al. | |
| 2006/0161871 A1 | 7/2006 | Hotelling et al. | |
| 2007/0252821 A1 | 11/2007 | Hollemans et al. | |
| 2008/0029691 A1 | 2/2008 | Han | |
| 2008/0165141 A1 * | 7/2008 | Christie | 345/173 |

(Continued)

OTHER PUBLICATIONS

Non-final Office Action mailed Sep. 12, 2011 in U.S. Appl. No. 12/024,007, 46 pages.

(Continued)

*Primary Examiner* — William Boddie
*Assistant Examiner* — Andrew Schnirel
(74) *Attorney, Agent, or Firm* — Fish & Richardson P.C.

(57) ABSTRACT

Methods and systems for interfacing with multi-point input devices employ various techniques for controlling displayed images, including 2D and 3D image translation, scale/zoom, rotation control and globe axis tilt control. Various techniques employ three or more simultaneous inputs, changes in characteristics of those inputs, and pressure sensing, among other things.

14 Claims, 3 Drawing Sheets

U.S. PATENT DOCUMENTS

| | | |
|---|---|---|
| 2008/0180405 A1 | 7/2008 | Han et al. |
| 2008/0180406 A1 | 7/2008 | Han et al. |
| 2010/0162181 A1 | 6/2010 | Shiplacoff et al. |
| 2011/0041098 A1 | 2/2011 | Kajiya et al. |
| 2011/0164029 A1 | 7/2011 | King |
| 2011/0169832 A1 | 7/2011 | Brown et al. |
| 2011/0210943 A1 | 9/2011 | Zaliva |
| 2011/0227947 A1 | 9/2011 | Benko et al. |
| 2011/0279397 A1 | 11/2011 | Rimon et al. |

OTHER PUBLICATIONS

Non-final Office Action mailed Sep. 13, 2011 in U.S. Appl. No. 12/024,005, 44 pages.
Davidson et al., "Extending 2D Object Arrangement with Pressure-Sensitive Layering Cues," UIST '08, Oct. 19-22, 2008, Monterey, California, 4 pages.
Gingold et al., "A Direct Texture Placement and Editing Interface," UIST' 06, Oct. 15-18, 2006, Montreux, Switzerland, 9 pages.
Reisman et al., "A Screen-Space Formulation for 2D and 3D Direct Manipulation," UIST '09, Oct. 4-7, 2009, Victoria, British Columbia, Canada, 10 pages.
Buxton, W., Hill, R., and Rowley, P., "Issues and Techniques in Touch-Sensitive Tablet Input," Proceedings of the 12th Annual Conference on Computer Graphics and Interactive Techniques SIGGRAPH '85, ACM Press, New York, N.Y., 215-224 (1985).
Michael Chen, "A Study in Interactive 3-D Rotation Using 2-D Control Devices," Computer Graphics, vol. 22, No. 4, 121-129 (1988).
K. Shoemake, "ARCBALL: A User Interface for Specifying Three-Dimensional Orientation Using a Mouse," Proceedings of the conference on Graphics interface '92, 151-156 (1992).
Ken Hinckley, "Haptic Issues for Virtual Manipulation," A Dissertation Presented to the Faculty of the School of Engineering and Applied Science at the University of Virginia, section 6.1-6.3 (1996), from the website http://research.microsoft.com/Users/kenh/thesis/front.htm.
Dietz, P. and Leigh, D., "DiamondTouch: A Multi-User Touch Technology," Proceedings of the 14th Annual ACM Symposium on User Interface Software and Technology (Orlando, Fla., Nov. 11-14, 2001), UIST '01. ACM Press, New York, N.Y., 219-226 (2001).
Lee, S., Buxton, W. and Smith, K. C., "A Multi-Touch Three Dimensional Touch-Sensitive Tablet," Proceedings of the SIGCHI Conference on Human Factors in Computing Systems (San Francisco, Calif., United States), CHI '85. ACM Press, New York, N.Y., 21-25 (1985).
Malik, S. and Laszlo, J., "Visual Touchpad: A Two-Handed Gestural Input Device," Proceedings of the 6th International Conference on Multimodal Interfaces (State College, Pa., USA, Oct. 13-15, 2004), ICMI '04. ACM Press, New York, N.Y., 289-296 (2004).
Rekimoto, J., "SmartSkin: An Infrastructure for Freehand Manipulation on Interactive Surfaces," Proceedings of the SIGCHI Conference on Human Factors in Computing Systems, CHI '02, ACM Press, New York, N.Y., 113-120 (2002).
Westerman, W., Elias, J. G., and Hedge, A., "Multi-Touch: A New Tactile 2-D Gesture Interface for Human-Computer Interaction," Proceedings of the Human Factors and Ergonomics Society 45th Annual Meeting (Minneapolis/St. Paul, Minn., Oct. 2001), 632-636 (2001).
Wilson, A. D., "TouchLight: An Imaging Touch Screen and Display for Gesture-Based Interaction," Proceedings of the 6th International Conference on Multimodal Interfaces (State College, Pa., USA, Oct. 13-15, 2004), ICMI '04. ACM Press, New York, N.Y., 69-76 (2004).
Wu, M. and Balakrishnan, R., "Multi-Finger and Whole Hand Gestural Interaction Techniques for Multi-User Tabletop Displays," Proceedings of the 16th Annual ACM Symposium on User Interface Software and Technology (Vancouver, Canada, Nov. 2-5, 2003), UIST '03, ACM Press, New York, N.Y., 193-202 (2003).
R. Balakrishnan and K. Hinckley, "Symmetric bimanual interaction," CHI '00: Proceedings of the SIGCHI conference on Human factors in computing systems, 33-40 (2000).
R. Balakrishnan and G. Kurtenbach, "Exploring bimanual camera control and object manipulation in 3D graphics interfaces," CHI '99: Proceedings of the SIGCHI conference on Human factors in computing systems, 56-63 (1999).
Y. Guiard, "Asymmetric division of labor in human skilled bimanual action: The kinetic chain as a model," Journal of Motor Behavior, 19(4):486-517 (1987).
K. Hinckley, R. Pausch, J. C. Goble, and N. F. Kassel!, "Passive real-world interface props for neurosurgical visualization," CHI '94: Proceedings of the SIGCHI conference on Human factors in computing systems, 452-458 (1994).
G. Kurtenbach, G. Fitzmaurice, T. Baudel, and B. Buxton, "The design of a GUI paradigm based on Tablets, Two-hands, and Transparency," CHI '97: Proceedings of the SIGCHI conference on Human factors in computing systems, 35-42 (1997).
I. Llamas, B. Kim, J. Gargus, J. Rossignac, and C. D. Shaw, "Twister: a space-warp operator for the two-handed editing of 3D shapes," ACM Transactions on Graphics, 22(3):663-668 (2003).
R. Zeleznik, A. Forsberg, and P. Strauss, "Two pointer input for 3D interaction," SI3D '97: Proceedings of the 1997 symposium on Interactive 3D graphics, 115-120 (1997).
T. Beier and S. Neely, "Feature-based image metamorphosis," Computer Graphics (SIGGRAPH Conference Proceedings), pp. 35-42, 1992.
T. Igarashi, T. Moscovich, and J. F. Hughes, "As-rigid-aspossible shape manipulation," ACM Transactions on Graphics, 24(3):1134-1141,2005.
D. L. James and D. K. Pai, "ArtDefo: accurate real time deformable objects," Computer Graphics (SIGGRAPH Conference Proceedings), pp. 65-72, 1999.
Agarawala, A. and Balakrishnan, R., "Keepin' it real: pushing the desktop metaphor with physics, piles and the pen," Proceedings of SIGCHI 2006, pp. 1283-1292. ACM Press, Apr. 2006.
Beaudouin-Lafon, M., "Novel interaction techniques for overlapping windows," Proceedings of UIST 2001, pp. 153-154. ACM Press, Nov. 2001.
Dragicevic, P., "Combining crossing-based and paper-based interaction paradigms for dragging and dropping between overlapping windows," Proceedings of UIST 2004, pp. 193-196. ACM Press, Oct. 2004.
Mander, R., Salomon, G., and Wong, Y. Y., "A 'pile' metaphor for supporting casual organization of information," Proceedings of SIGCHI 1992, pp. 627-634. ACM Press, May 1992.
Ramos, G., Boulos, M., and Balakrishnan, R., "Pressure widgets," Proceedings of SIGCHI 2004, pp. 487-494, ACM Press, Apr. 2004.
Ramos, G., et al., "Tumble! Splat! helping users access and manipulate occluded content in 2D drawings," Proceedings of AVI 2006, pp. 428-435, ACM Press, May 2006.
Terrenghi, L., Kirk, D., Sellen, A., and Izadi, S., "Affordances for manipulation of physical versus digital media on interactive surfaces," Proceedings of SIGCHI 2007, pp. 1157-1166, ACM Press, Apr. 2007.
Frohlich, B., Tramberend, H., Beers, A., Agrawala, M., and Baraff, D., "Physically-Based Manipulation on the Responsive Workbench," Proceedings of the IEEE Virtual Reality 2000 Conference (Mar. 18-22, 2000), VR. IEEE Computer Society, Washington, DC, 5.
Gleicher, M. and Witkin, A., "Through-the-Lens Camera Control," Proceedings of the 19th Annual Conference on Computer Graphics and Interactive Techniques J.J. Thomas, Ed. SIGGRAPH '92. ACM, New York, NY, 331-340, 1992.
Grossman, T., Wigdor, D., and Balakrishnan, R., "Multi-finger gestural interaction with 3d volumetric displays," Proceedings of the 17th Annual ACM Symposium on User interface Software and Technology (Santa Fe, NM, USA, Oct. 24-27, 2004), UIST '04, ACM, New York, NY, 61-70. DOI= http://doi.acm.org/10.1145/1029632.1029644, 2004.
Hancock, M., Carpendale, S., and Cockburn, A., "Shallow-depth 3d interaction: design and evaluation of one-, two- and three-touch techniques," Proceedings of the SIGCHI Conference on Human Factors in Computing Systems (San Jose, California, USA, Apr. 28-May 3, 2007), CHI '07, ACM, New York, NY, 1147-1156, 2007.

Kyung, M., Kim, M., and Hong, S.J., "A new approach to through-the-lens camera control," Graph, Models Image Process, 58, 3 (May 1996), 262-285, 1996.

Nielsen, G.M. and Olsen, D.R., "Direct manipulation techniques for 3D objects using 2D locator devices," Proceedings of the 1986 Workshop on interactive 3D graphics (Chapel Hill, North Carolina, United States), F. Crow and S.M. Pizer, Eds. SI3D '86, ACM, New York, NY, 175-182, 1987.

Nocedal, J. and Wright, M., "Numerical Optimization," Springer, New York (1999).

Snibbe, S.S., Herndon, K.P., Robbins, D.C., Conner, D.B., and van Dam, A., "Using deformations to explore 3D widget design," Proceedings of the 19th Annual Conference on Computer Graphics and interactive Techniques, J.J. Thomas, Ed., SIGGRAPH '92, ACM, New York, NY, 351-352, 1992.

Wilson, A.D., Izadi, S., Hilliges, O., Garcia-Mendoza, A., and Kirk, D., "Bringing physics to the surface," Proceedings of the 21st Annual ACM Symposium on User interface Software and Technology (Monterey, CA, USA, Oct. 19-22, 2008), UIST '08, ACM, New York, NY, 67-76, 2008.

* cited by examiner

FIGURE 6A
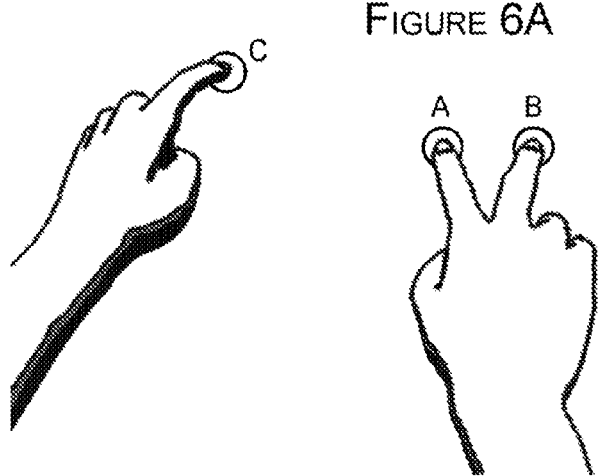
FIGURE 6B
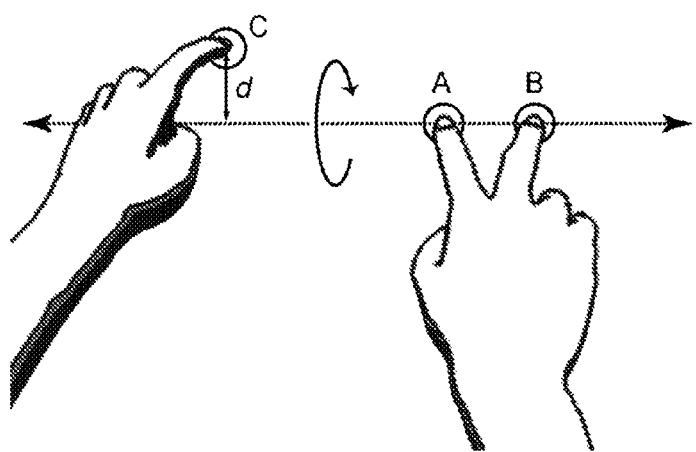
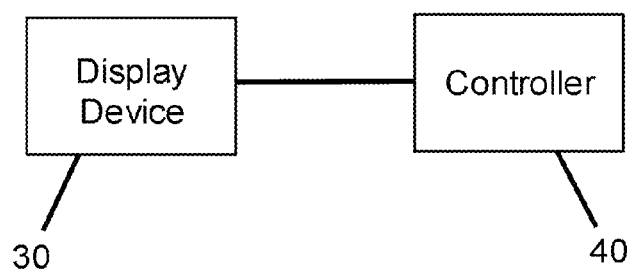
FIGURE 7

METHODS OF INTERFACING WITH MULTI-POINT INPUT DEVICES AND MULTI-POINT INPUT SYSTEMS EMPLOYING INTERFACING TECHNIQUES

REFERENCE TO RELATED APPLICATION

This application claims priority to U.S. Provisional Patent Application No. 60/887,489, filed Jan. 31, 2007, the disclosure of which is incorporated herein by reference.

BACKGROUND OF THE INVENTION

1. Field of the Invention

The present invention relates to methods of interfacing with multi-point input devices, and multi-point input systems that employ interface techniques.

2. Description of the Related Art

So-called touch screen displays are well known and common in many industrial applications. As an example, most bank ATMs use touch screen displays. As the utility of these types of displays increases, displays within home and business, including televisions and computer monitors, are increasingly becoming touch sensitive.

Recently, multi-touch input devices are becoming more available for various uses due to advancements in relevant touch sensing technologies, reductions in cost, and other factors. Multi-touch input devices, by definition, are capable of detecting multiple inputs simultaneously. U.S. patent application Ser. No. 11/833,908 to Han, filed Aug. 3, 2007, U.S. Patent Application No. 60/821,325 to Han, filed Aug. 3, 2006, and U.S. Patent Application No. 60/953,966 to Han, filed Aug. 3, 2007, all assigned to the assignee of the present invention, identify various technologies and publications within the field, and further describe additional advancements in multi-touch sensing through frustrated total internal reflection. U.S. patent application Ser. Nos. 11/833,908, 60/821, 325 and 60/953,966 are incorporated fully herein by reference.

Interface control technology, including interfacing techniques, has been widely studied. The following publications explore various concepts, methodologies and techniques in this area: Buxton, W., Hill, R., and Rowley, P., "Issues and Techniques in Touch-Sensitive Tablet Input," Proceedings of the 12th Annual Conference on Computer Graphics and Interactive Techniques SIGGRAPH '85, ACM Press, New York, N.Y., 215-224 (1985); Michael Chen, "A Study in Interactive 3-D Rotation Using 2-D Control Devices," Computer Graphics, Vol. 22, No. 4, 121-129 (1988); K. Shoemake, "ARCBALL: A User Interface for Specifying Three-Dimensional Orientation Using a Mouse," Proceedings of the conference on Graphics interface '92, 151-156 (1992); Ken Hinckley, "Haptic Issues for Virtual Manipulation," A Dissertation Presented to the Faculty of the School of Engineering and Applied Science at the University of Virginia, section 6.1-6.3 (1996), from the website http://research.microsoft.com/Users/kenh/thesis/front.htm; Dietz, P. and Leigh, D., "DiamondTouch: A Multi-User Touch Technology," Proceedings of the 14th Annual ACM Symposium on User Interface Software and Technology (Orlando, Fla., Nov. 11-14, 2001), UIST '01. ACM Press, New York, N.Y., 219-226 (2001); Lee, S., Buxton, W. and Smith, K. C., "A Multi-Touch Three Dimensional Touch-Sensitive Tablet," Proceedings of the SIGCHI Conference on Human Factors in Computing Systems (San Francisco, Calif., United States), CHI '85. ACM Press, New York, N.Y., 21-25 (1985); Malik, S. and Laszlo, J., "Visual Touchpad: A Two-Handed Gestural Input Device," Proceedings of the 6th International Conference on Multimodal Interfaces (State College, Pa., USA, Oct. 13-15, 2004), ICMI '04. ACM Press, New York, N.Y., 289-296 (2004); Rekimoto, J., "SmartSkin: An Infrastructure for Freehand Manipulation on Interactive Surfaces," Proceedings of the SIGCHI Conference on Human Factors in Computing Systems, CHI '02, ACM Press, New York, N.Y., 113-120 (2002); Westerman, W., Elias, J. G., and Hedge, A., "Multi-Touch: A New Tactile 2-D Gesture Interface for Human-Computer Interaction," Proceedings of the Human Factors and Ergonomics Society 45th Annual Meeting (Minneapolis/St. Paul, Minn., October 2001), 632-636 (2001); Wilson, A. D., "TouchLight: An Imaging Touch Screen and Display for Gesture-Based Interaction," Proceedings of the 6th International Conference on Multimodal Interfaces (State College, Pa., USA, Oct. 13-15, 2004), ICMI '04. ACM Press, New York, N.Y., 69-76 (2004); and Wu, M. and Balakrishnan, R., "Multi-Finger and Whole Hand Gestural Interaction Techniques for Multi-User Tabletop Displays," Proceedings of the 16th Annual ACM Symposium on User Interface Software and Technology (Vancouver, Canada, Nov. 2-5, 2003), UIST '03, ACM Press, New York, N.Y., 193-202 (2003), each of which is incorporated herein by reference.

Various publications explore two-handed input. These include: R. Balakrishnan and K. Hinckley, "Symmetric bimanual interaction," CHI '00: Proceedings of the SIGCHI conference on Human factors in computing systems, 33-40 (2000); R. Balakrishnan and G. Kurtenbach, "Exploring bimanual camera control and object manipulation in 3D graphics interfaces," CHI '99: Proceedings of the SIGCHI conference on Human factors in computing systems, 56-63 (1999); Y. Guiard, "Asymmetric division of labor in human skilled bimanual action: The kinetic chain as a model," Journal of Motor Behavior, 19(4):486-517 (1987); K. Hinckley, R. Pausch, J. C. Goble, and N. F. Kassell, "Passive real-world interface props for neurosurgical visualization," CHI '94: Proceedings of the SIGCHI conference on Human factors in computing systems, 452-458 (1994); G. Kurtenbach, G. Fitzmaurice, T. Baudel, and B. Buxton, "The design of a GUI paradigm based on Tablets, Two-hands, and Transparency," CHI '97: Proceedings of the SIGCHI conference on Human factors in computing systems, 35-42 (1997); I. Llamas, B. Kim, J. Gargus, J. Rossignac, and C. D. Shaw, "Twister: a space-warp operator for the two-handed editing of 3D shapes," ACM Transactions on Graphics, 22(3):663-668 (2003); and R. Zeleznik, A. Forsberg, and P. Strauss, "Two pointer input for 3D interaction," SI3D '97: Proceedings of the 1997 symposium on Interactive 3D graphics, 115-120 (1997). Each of these publications is incorporated herein by reference.

Other patent publications in this field include U.S. Patent Publication Nos. 2006/0026521, 2006/0026535, 2006/0053387, 2006/0085757, 2006/0033724, 2006/0161870, 2006/0161871, and 2006/0026535, each of which is incorporated herein by reference.

SUMMARY OF THE INVENTION

Human interface techniques that take full advantage of the multi-input capability of multi-input sensing technology need to be developed. It is therefore a general object of the present invention to provide methods and systems for facilitating human interfacing with multi-input technology, such as multi-touch tablets and multi-touch display devices. More specific objects of the present invention are discussed in the detailed description section provided below.

In accordance with the present invention, a method of interfacing with a multi-point input device comprises displaying an image on a display device, detecting positions of at least three elements simultaneously contacting the device, identifying a change in an attribute of the elements, and controlling a change in the image displayed on the display device in accordance with the identified change in the attribute.

As an aspect of the present invention, identifying a change in an attribute entails identifying movement of a centroid of the three elements, and controlling a change in the image entails controlling translation of the image displayed on the display device in accordance with movement of the centroid.

As a further aspect of the present invention, identifying a change in an attribute entails identifying changes in distances of the elements to a centroid of the elements, and controlling a change in the image entails controlling a scale of the image as a function of the identified changes in distances of the elements to the centroid.

As an additional aspect of the present invention, identifying a change in an attribute entails calculating an area defined by the elements, and controlling a change in the image entails controlling a scale of the image as a function of the calculated area.

As another aspect of the present invention, identifying a change in an attribute entails identifying a position of a centroid of the elements, and identifying changes in angles of the elements relative to the centroid, and controlling a change in the image entails controlling a rotation of the image as a function of the identified changes in angles of the elements.

As yet a further aspect of the present invention identifying a change in an attribute entails establishing a plurality of geometric position constraints, each of the geometric position constraints corresponding to an initial position of a respective one of the elements, identifying new positions of the elements, and solving, using numeric optimization, the orientation parameters of the displayed image to best match to the new positions of the elements; and controlling a change in the image displayed on the display device entails controlling the image in accordance with the solved orientation parameters.

As yet another aspect of the present invention, displaying an image on a display device comprises displaying an image corresponding to a three-dimensional graphical representation of an object.

As a feature of this aspect, identifying a change in an attribute entails identifying movement of a centroid of the elements, and controlling a change in the image entails controlling translation of the three-dimensional graphical representation of the object in accordance with movement of the centroid.

As a further aspect of the present invention, controlling translation of the three-dimensional graphical representation of the object comprises controlling the image so that a centroid of the object moves in accordance with movement of the centroid.

As another aspect of the present invention, identifying a change in an attribute entails identifying changes in distances of the elements to a point disposed within an area defined by the elements, and controlling a change in the image entails controlling a scale of the three-dimensional graphical representation of the object as a function of the identified changes in distances of the elements to the point.

As an additional aspect of the present invention, identifying a change in an attribute entails identifying a position of a centroid of the three elements, and identifying changes in distances of the elements to the centroid, and controlling a change in the image entails controlling a scale of the three-dimensional graphical representation of the object as a function of the identified changes in distances of the elements to the centroid.

As yet another aspect of the present invention, identifying a change in an attribute entails calculating an area defined by the elements, and controlling a change in the image entails controlling a scale of the three-dimensional graphical representation of the object as a function of the calculated area.

As yet a further aspect of the present invention, identifying a change in an attribute entails identifying a position of a centroid of the at least three elements, and identifying changes in distances of the elements to the centroid, and controlling a change in the image entails controlling movement of the three-dimensional graphical representation of the object along an axis normal to the display surface of the display device as a function of the identified changes in distances of the elements to the centroid.

As still yet another aspect of the present invention, identifying a change in an attribute entails calculating a change in an area defined by the elements, and controlling a change in the image entails controlling movement of the three-dimensional graphical representation of the object along an axis normal to the display surface of the display device as a function of changes in the area.

As still yet a further aspect of the present invention, identifying a change in an attribute entails identifying a position and movement of a centroid of the elements, and identifying changes in distances of the elements to the centroid, and controlling a change in the image entails controlling translation of the three-dimensional graphical representation of the object along X and Y axes in accordance with movement of the centroid, and controlling movement of the three-dimensional graphical representation of the object along a Z axis as a function of the identified changes in distances of the elements to the centroid, the X, Y and Z axes being perpendicular to one another.

As a feature of this aspect, the Z axis is normal to the display surface of the display device.

As another aspect of the present invention, identifying a change in an attribute entails identifying changes in angles of the elements about a point disposed within an area defined by the elements, and controlling a change in the image entails controlling a rotation of the object displayed on the display device about an axis normal to the display surface of the display device as a function of the identified changes in angles of the elements about the point.

As a further aspect of the present invention, controlling a rotation of the object displayed on the display device comprises controlling the rotation of the object about an axis passing through a centroid of the object represented by the three-dimensional graphical representation displayed on the display device.

As yet another aspect of the present invention, identifying a change in an attribute entails identifying changes in angles of the elements about a centroid of the elements, and controlling a change in the image entails controlling a rotation of the object displayed on the display device about an axis normal to the display surface of the display device as a function of the identified changes in angles of the elements about the centroid.

In accordance with another embodiment of the present invention, a method of interfacing with a multi-point input device, comprises the steps of displaying an image on a display device, detecting positions of at least three elements simultaneously contacting a multi-point input device, identifying a change in an attribute of the elements, and controlling a change in the image displayed on the display device in accordance with the identified change in the attribute.

In accordance with an embodiment entailing a multi-point input system of the present invention, the system comprises a display device for displaying an image on a display surface, the display device capable of detecting positions of at least three elements simultaneously contacting the display surface, and the system also includes a controller for identifying a change in an attribute of the elements, and for controlling a change in the image displayed on the display device in accordance with the identified change in the attribute.

In accordance with another embodiment entailing a multi-point input system of the present invention, the system comprises a display device for displaying an image, a multi-point input device having a contact surface, the multi-point input device adapted to detect positions of at least three elements simultaneously contacting the contact surface, and a controller for identifying a change in an attribute of the elements based on the detected positions of the elements contacting the contact surface, and for controlling a change in the image displayed by the display device in accordance with the identified change in the attribute.

As various aspects of each of these embodiments entailing a multi-point input system, the features and aspects previously mentioned with respect to the above-summarized methods of interfacing with a multi-point input device in accordance with the present invention also represent features and aspects of such systems of the present invention.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 6A and 6B schematically illustrate techniques for controlling globe tilt in accordance with yet a further embodiment of the present invention; and FIG. 7 is a block diagram of a system including a display device and a controller for carrying out the various techniques of the present invention.

DETAILED DESCRIPTION OF THE PRESENT INVENTION

The present invention pertains to techniques for interfacing with multi-point input devices, including multi-point input displays, multi-touch displays/screens, multi-point input capable touch tablets (e.g., without a display integrated), multi-point input devices that receive inputs via a human finger, a stylus or other mechanical, electro-mechanic, magnetic, etc., device, and any other device or apparatus capable of sensing simultaneous multiple inputs. As used herein, the contacting object, whether it is a human finger or stylus or other device, also is referred to herein (primarily in the claims) as an "element." The multi-point input displays/screens may be in the form of a computer monitor, a television, a telephone display, etc. As used herein, the terms "multi-point input device" or "multi-touch device" or "multi-point device" or the like (or, for convenience herein, "input device") shall refer to any of the above-mentioned devices.

Generalized 2D Object Movement/Scaling/Rotation Control

Figure 1A:
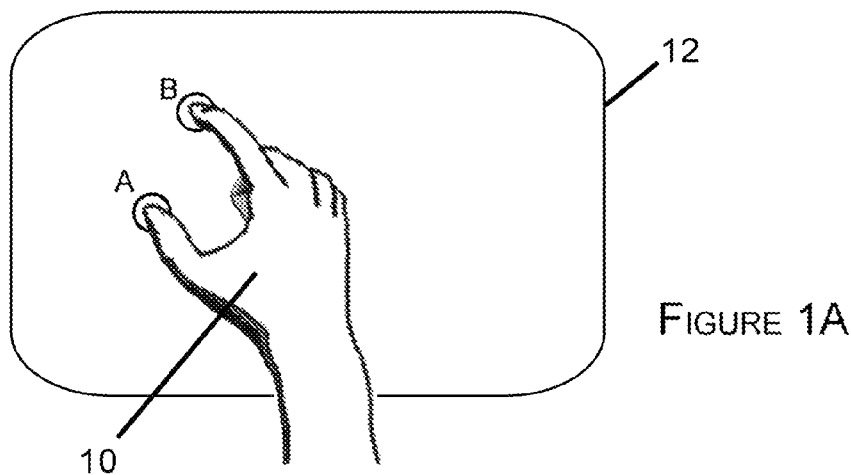
FIGS. 1A and 1B are schematic illustrations useful in describing multi-point input techniques.
Figure 1B:
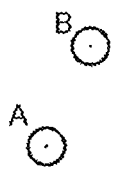

Referring first to FIGS. 1A and 1B of the drawings, two inputs A and B are schematically shown. Inputs A and B are contact points by, for example, the fingers of a user's hand 10, on a multi-point input device, such as multi-point input touch-sensitive display 12. For example, inputs A and B may correspond to a user's thumb and index finger, respectively. As another example, inputs A and B correspond to a user's index finger from each hand. Other finger combinations, from one or multiple hands, may be employed. Further, and as discussed below, a different number of fingers (e.g., 3 fingers, 4 fingers, 5 fingers) may be employed.

As is known, such as disclosed in G. Kurtenbach, G. Fitzmaurice, T. Baudel, and B. Buxton, "The design of a GUI paradigm based on Tablets, Two-hands, and Transparency," CHI '97: Proceedings of the SIGCHI conference on Human factors in computing systems, 35-42 (1997), cited above, and incorporated herein by reference, two input points may be utilized to effect the 2D position, uniform scaling, and 2D rotation of a 2D object on a display in a straightforward 4 degree-of-freedom ("DOF") operation. This also is known as pan-zoom-rotate, or "PZR," a term generally used when the camera is implied to be being manipulated rather than the object (though there is no functional difference). Here, two 2D points specify the 4-DOF exactly. The operation may be either based on a change from the initial positions of the points (i.e. when first contacting the surface), or based incrementally based on the changes in successive readings of the sensor.

Figure 2A:
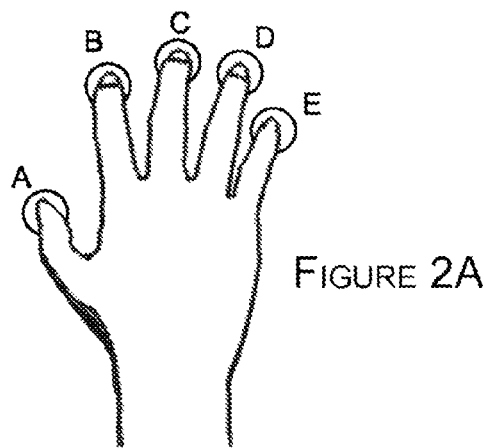
FIGS. 2A, 2B, 2C and 2D are schematic illustrations useful in describing various user interface techniques employing five inputs (e.g., fingers) simultaneously in accordance with the present invention.

Referring to FIG. 2A, five inputs A, B, C, D and E are schematically shown. In accordance with the present invention, the PZR can be generalized to control the same 4 degrees of freedom (2D translation, scaling, rotation) when more than two (i.e. N>2) inputs (e.g., touch points) are used. For example, translation can become generalized to the motion of the centroid of the positions of all N points. As another example, scale can be generalized by averaging the ratios in distances from each input to the centroid or, alternatively, be based on an area defined by the inputs (e.g., where the inputs represent the corners of a polygon). As a further example, rotation can be generalized by averaging the changes in angle each input has with the centroid. Accordingly, such a variant is referred to herein as "N-point-PZR" control.

In a more mathematically-based approach, each 2D input point on the object can be considered a geometric position constraint, and a numeric optimizer solves (at interactive rates) for the object's 4 orientation parameters to match the new positions of the touch points, while minimizing some error metric in the case it is overdetermined. For example, this can be setup as a system of linear equations, and solved with a method such as SVD.

3D Object Movement/Scaling/Rotation Control

Three-dimensional (3D) object movement/scaling/rotation control in accordance with the present invention entails use of one or more inputs to a multi-point input device to effectuate movement/scaling/rotation of a 3D object or scene that is displayed on a display device. The display device may or may not be the multi-point input device receiving the inputs. As an example, if the multi-point input device is a multi-touch display, then a 3D object or scene displayed on the multi-touch device may be controlled, as described herein, by one or more finger contacts with that device. For convenience, references to a "3D object" shall include either a displayed 3D object or a displayed 3D scene, unless otherwise stated herein. And for convenience, the X/Y axes of the 3D space typically lay within the display screen plane, unless otherwise stated herein.

In accordance with the present invention, a user controls various movements of a displayed 3D object (or scene) using one or more inputs. As set forth in the various embodiment and variations described herein, the position (along the x, y and z axes), scale (size) and/or orientation of a 3D object is controlled through the user's placement/movement/pressure of one or more inputs to (e.g., fingers on) the input device (e.g., multi-point input touch screen).

The user can effect a standard "trackball" (i.e. "arcball" or "virtual sphere")-style rotation by placing and moving a single input point on the 3D object. Alternatively, the single input point can be used to control vertical/horizontal movement (i.e. panning) of the 3D object instead.

The use of multiple (2 or more) input points simultaneously by the user allows for additional 3D control operations to be performed at once.

Figure 2B:
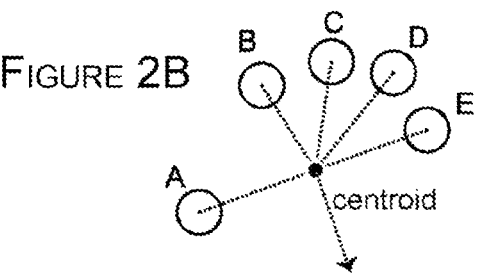

The user controls vertical/horizontal movement (i.e., panning) of the 3D object by vertically/horizontally moving some of the inputs (e.g., fingers). The precise location of the 3D object along the X/Y plane may be implemented in various manners. In one version, motion of the centroid of all the inputs (such as the exemplary downward motion shown in FIG. 2B) controls movement of the centroid of the 3D object along the X/Y plane (translation).

Figure 2C:
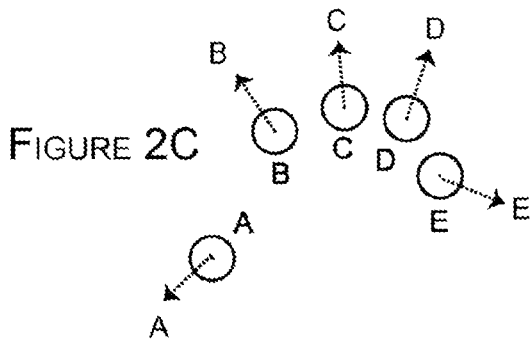

The user controls the scale of the 3D object (i.e., zooming) by modifying the relative size/area of the inputs. For example, the 3D object's scale may be a function of the average of the distances of each input to the centroid or be a function of the area of the convex hull of the points defined by the inputs. FIG. 2C schematically illustrates moving the inputs in an outward direction (stretching the fingers). For a hand contacting a multi-point input touch screen with multiple fingers, stretching the fingers corresponds to increasing the scale of the 3D object, whereas bringing the fingers together causes a decrease in scale.

In a variation, rather than changing object scale, moving out (stretching) and moving in the inputs controls the position of the 3D object along the Z axis. Thus, the 3D object's position along the X, Y and Z axes may be controlled in the manner described herein. As understood herein, various other techniques described herein for changing scale may be modified to control Z-position. Conversely, other techniques described herein for controlling/changing Z-position may be modified to control scale.

Figure 2D:
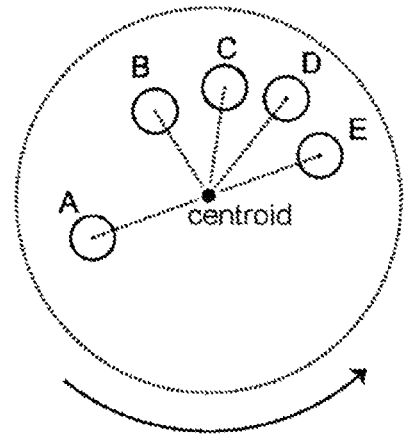

FIG. 2D schematically illustrates user rotation, in the clockwise or counter-clockwise direction, of the inputs to control rotation of the 3D object about the Z axis (i.e. within the X-Y plane). For example, rotation of the 3D object may be a function of the average of the changes in the angle each input has with the centroid.

Figure 3A:
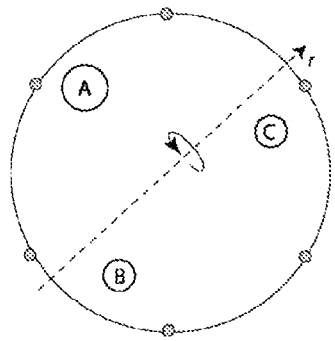
FIGS. 3A and 3B schematically illustrate techniques for implementing rotation in accordance with an embodiment of the present invention.

Referring next to FIG. 3A, which shows three inputs A, B and C, rotation of the 3D object about an axis "r" embedded in the view (i.e. X-Y) plane (i.e., the display surface) is carried out by the user exerting additional pressure at one or more of the inputs. As an example, the user may exert additional pressure at input A (e.g., by the thumb) to cause the 3D object to rotate in one direction about axis r, or may exert additional pressure at inputs B and C (e.g., by the index and middle fingers) to cause the object to rotate in the opposite direction about axis r.

Preferably, the multi-point input device is a pressure sensitive type device capable of ascertaining changes in pressure and/or measuring true force. High resolution multi-touch sensing devices, with or without true force sensitivity, also can derive similar force-like data by evaluating each contact area, which may increase with force due to the pliability of the human finger. Such evaluation can be carried out using any suitable technique (sometimes called Simulated Pressure techniques). One example of a suitable technique is discussed in the publication H. Benko, et al., "Precise Selection Techniques for Multi-Touch Screens," Conference on Human Factors in Computing Systems, Proceedings of the SIGCHI conference on Human Factors in computing systems, 1263-1272 (2006), which is incorporated herein by reference. For purposes herein, pressure detection, pressure measurement and the like shall include techniques that derive force-like data.

Figure 3B:
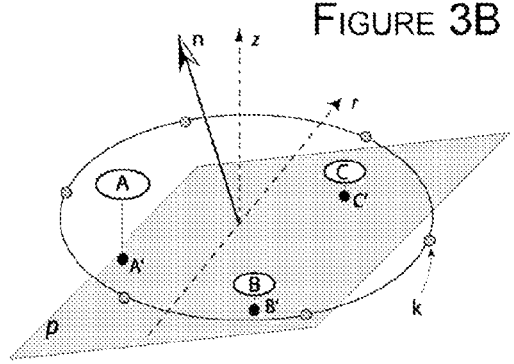

Referring to FIG. 3B, one manner of calculating the amount of rotation includes interpreting pressure as "depth" below the input surface, resulting in a set of 3D points (e.g., points A', B' and C' in FIG. 3B). A best-fit 3D plane is computed to these 3D points. The best-fit plane will appear to tilt towards the inputs having greater force. Mathematically, there is a direction and angle between the normal vector of the best-fit 3D plane, and the normal of the screen (X-Y) plane (e.g., Z-axis), and this direction/angle specifies an incremental rotation operation on the 3D object. In other words, a "tilt" transform is applied as an incremental rotation about the in-plane axis R that maps the Z-axis to n. Preferably, to ensure that n is well-defined, a set of weak constraint points k are included around the circular boundary of the control with depth equal to zero.

FIGS. 3A and 3B show three inputs (e.g., three fingers contacting the input device). However, as mentioned above, the user may employ a different number of fingers (i.e., inputs or elements). For example, the user may press the input device with five fingers of a hand, as shown in FIG. 2A. Regardless of whether three inputs are employed, five inputs, or another number of inputs, if the fingers (inputs) that are touching the right side of the 3D object are pressed harder than the other fingers, the object is controlled to tumble left-to-right. As another example, if only a single finger is pressing harder on the left side of the 3D object, the object is controlled to tumble right-to-left. For consistency, solution parameters are adjusted when input points are added or removed, that is, when more or less fingers contact the display, in order to maintain a constant transformation.

As a particularly useful feature of the present invention, rotation preferably is engaged only when the forces on all inputs exceed a predetermined "deadband" threshold, thus preventing unintended rotation during other movement control of the 3D object (e.g., panning, zooming, rotating about the Z plane).

The above-described 3D object movement/scaling/rotation control techniques combine isotonic controlled rotation (along the input plane) with isometric controlled tilt (about a variable axis r). The present invention further entails 3D object movement/scaling/rotation control without employing pressure measurement, as described below.

Figure 4A:
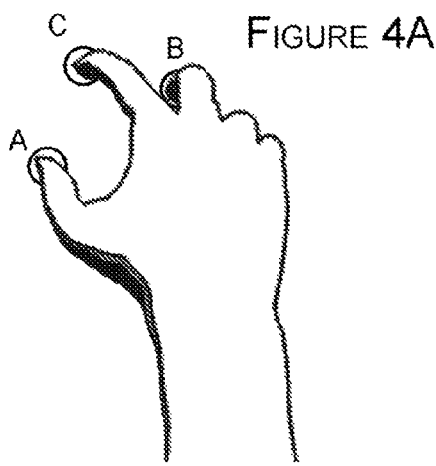
FIGS. 4A and 4B schematically illustrate techniques for 3D object movement/scaling/rotation in accordance with further embodiments of the present invention.

3D object movement/scaling/rotation control in accordance with another embodiment of the present invention entails usage of a first set of inputs (e.g., inputs A and B shown in FIG. 4A), temporally followed by a third input (e.g., input C), where the 3D object rotates about axis R during the existence of input C, and axis R is defined as being embedded within the XY plane and whose angle within that plane is specified by the positions of A and B. Thus, the amount of rotation is a function of the amount of time input C is received. Preferably, input C's location is within a suitable control area (e.g., within a predetermined distance from the other inputs) so to prevent rotation by inputs relatively remote from inputs A and B. The rate of rotation may be constant (e.g., angularly) or progressively increases while input C is received. In any case, the axis R can be continuously adjusted by the user during the rotation operation by moving the positions of inputs A and B.

Figure 4B:
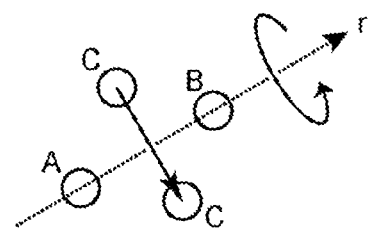

The direction (clockwise or counterclockwise) of rotation about the axis R may be controlled by input C's position relative to A's and B's positions. In one variation, an input C to the right (or above) line segment A-B causes the 3D object to rotate in one direction, while an input C to the left (or below) line segment A-B causes the 3D object to rotate in the opposite direction. In another variation, the relative distance of input C to line segment A-B designates tilt direction. Different control areas may be designated visually upon receipt of inputs A and B, assisting the user as to the appropriate locations where input C may be received to initiate rotation in one direction or rotation in the opposite direction, as shown in FIG. 4B. In yet a further variation, tilt direction is controlled by a fourth input (e.g., a fourth finger of the user's hand, or on the other hand), with the presence/absence of the fourth input or the particular location of the fourth input designating rotation direction.

In certain embodiments described herein, rotation is controlled by sensing additional pressure. In other embodiments, rotation is controlled by the duration of an input.

Rotation further may be controlled by utilizing input motion information. In particular, 3D object movement/scaling/rotation control in accordance with a further embodiment of the invention entails inputs A, B and C, with the new position of input C' relative to original position C designating the amount of rotation about axis r, defined by line segment AB That is, as input C moves closer or further away from line segment AB, the amount of rotation about axis R changes. The direction and magnitude of rotation is dependent on the direction and length of C-C'. The direction and length of the component of C-C' that is perpendicular to AB may also only be used to control direction and magnitude of rotation. During one-handed implementation, a user may opt to utilize his/her thumb and middle finger as inputs A and B, respectively, and the index finger as input C. Of course, other finger combinations may be employed, as well as multi-hand utilization.

3D Globe View Control

While it is possible to navigate a 3D representation of the earth or other sphere-like body with a standard 6-DOF camera model (x, y, z position, and 3-axis orientation), the present invention provides various methods and techniques that advantageously enable users to more easily and intuitively navigate a globe. As used herein, the term "globe" shall include the earth or other orbital body, or other sphere-like or somewhat-sphere-like structure or body.

As further described herein, navigation of a globe in accordance with the present invention entails the following components: a 2 degree-of-freedom ("2 DOF") point of interest (POI) coordinate in units such as latitude and longitude, a distance (or range) to that point of interest, an azimuth angle (e.g., angle from north), and a tilt angle (e.g., angle from the surface normal), for a total of 5 degrees-of-freedom. Preferably, a roll angle is not included, as it is generally not useful for observing subjects on the surface of the globe, as humans naturally assume that the horizon is always horizontal, and it can be very disorienting to the user when it is not.

As is appreciated, while the herein described 5 DOF globe navigation process seemingly does not have the full flexibility of the 6-DOF free-space camera model, a reduction in the freedom of the camera provides various benefits to users, including ease of use and reduction in camera control distractions, as described herein.

In currently available systems and techniques, a user utilizes a computer mouse to provide for two-degrees of freedom of information, for example, to change the two parameters relating to POI coordinates. In order for the user to adjust another parameter, such as range, azimuth, or tilt, the user selects another tool or holds down another key (a "modifier key" such as Control or Shift) to indicate that the mouse should now manipulate an alternate set. Not only is such mode switching cumbersome, but it is impossible to simultaneously adjust more than any two at a time, forcing the user to decompose a view manipulation into a sequence of individual operations.

In accordance with the present invention, more that one set of 2D coordinates may be input at a time employing a multi-point input device, thus permitting more advanced ways of controlling the view of the globe than currently available.

In accordance with particular embodiments of the present invention, PZR control is applied to four of the five degrees of freedom of 3D globe navigation (latitude, longitude, range, azimuth, tilt). In particular, the four DOFs that correspond to PZR control are: 2D translation along the surface of the sphere (i.e., latitude, longitude); distance change (range); and rotation around the surface normal, more generally known in mapping as the "azimuth" angle. As used herein, the term "PZR-Globe" refers to such PZR control. But, however, as is appreciated, PZR-Globe control of the present invention does not have a one-to-one correspondence, that is, pure translation along the surface of the sphere may also cause a change in azimuth (e.g., if measured relative to the north pole of the globe). A quaternion representation of globe orientation may be used as an intermediary to perform these view changes robustly. Translation is preferably performed to visually correspond to the motion on the display screen plane.

Figure 5:
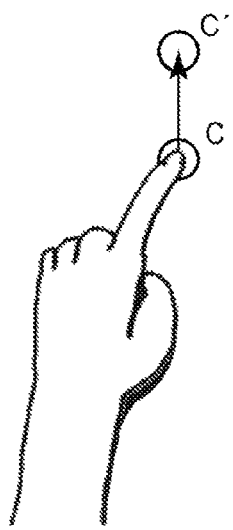
FIG. 5 schematically illustrates techniques for controlling a displayed globe, including tilt control, in accordance with yet another embodiment of the present invention.
Figure 5:
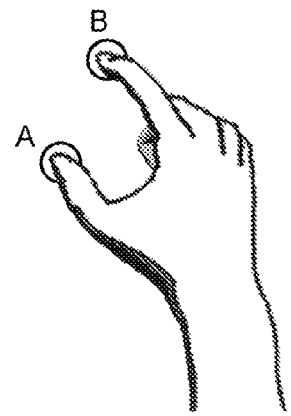

Tilt, the fifth of the four degrees of freedom discussed above, in accordance with the present invention, is controlled by utilizing a third input. Referring to FIG. 5, the user makes contact with the input device (e.g., touches the multi-point input display) with a third input C (e.g., with a third finger) after the first two inputs A and B, and movement (or sliding) of the third input to a different position C' operates to control globe tilt. In one variation of the invention, tilt angle is a function of the vertical distance between the initial and final positions of the third input. In a variation, a rate of tilt rotation is a function of the distance traveled by the third input. In either of these variations, the tilt function may employ a minimum threshold distance away from the cluster of inputs used for PZR-Globe control, thus requiring the third input to be a set minimum distance away from the other inputs to control tilt.

PZR-Globe control and tilt control, in accordance with the invention, may be implemented with fingers from the same hand (e.g., thumb, index, middle), or with fingers from both hands. For example, the thumb and index finger of one hand provides PZR-Globe control, with the index finger of the other hand controlling tilt. Whether one or two hands are employed to carry out PZR-globe control and tilt control, all 5 degrees of freedom can be controlled simultaneously.

Referring to FIG. 6A, in accordance with another embodiment of the present invention, the user provides first and second inputs A and B (e.g., two finger contact) horizontally on the input device and maintains these two inputs in stationary positions, so that no PZR-Globe control is carried out. Upon receipt of the two inputs, a virtual axis is defined as the horizontal line on the input device contact surface extending between the two inputs A and B. The user effects a tilt by initiating a third input C on the input device surface, where direction and magnitude of tilt adjustment is a function of the distance d between the third input C and the virtual axis, as shown in FIG. 6B. For example, if input C is above and relatively far away from the virtual axis, the globe is controlled to tilt away from the vertical at a relatively quick rate. As another example, if input C is below and relatively close to the virtual axis, the view tilts towards the vertical at a relatively slow rate. In an alternative embodiment, rather than utilizing the third input's distance from the virtual axis, the magnitude of tilt rotation is a function of the force of the third input.

Various embodiments for interfacing with multi-point input devices have been described. The present invention also encompasses a system capable of carrying out the various interfacing techniques and processes described herein. For example, FIG. 7 is a block diagram of a multi-point input system 20 that includes a display device 30 coupled to a controller 40. Display device 30 includes a display surface (also called contact surface) and may be any suitable type of multi-point input display device capable of detecting multiple inputs simultaneously. Various suitable multi-input display devices that may be employed include those described in U.S. patent application Ser. No. 11/833,908, which is incorporated herein by reference. Controller 40 operates to carry out the various processing functions described herein, and may be a pre-programmed general purpose computer or other known system or device that carries out the novel functions/steps as previously described. Controllers suitable for use within the present invention are well known, and it is within the abilities of one of ordinary skill in the art to design and/or program a controller to implement the processes, techniques and features of the present invention, given the description provided herein. Accordingly, the present invention encompasses a system that includes a display device and a controller capable of implementing the above-described techniques and processes. Consistent with other variations described herein, display device 30 may include a multi-point input device and, as a separate element, a display device.

The present invention has been described in the context of a number of embodiments, and for various ones of those embodiments, a number of variations and examples thereof. It is to be understood, however, that other expedients known to those skilled in the art or disclosed herein may be employed without departing from the spirit of the invention.

Therefore, it is intended that the appended claims be interpreted as including the embodiments described herein, the alternatives mentioned above, and all equivalents thereto.

What is claimed is:

1. A method of interfacing with a multi-point input device, comprising the steps of:
    displaying an image on a display device, the image corresponding to a three-dimensional graphical representation of an object;
    detecting positions of at least three elements that are simultaneously in contact with the display device;
    identifying a change in an attribute of the at least three elements;
    controlling a change in the image displayed on the display device in accordance with the identified change in the attribute of the at least three elements, and
    calculating a centroid of the at least three elements,
    wherein identifying a change in an attribute comprises:
        identifying-movement of the centroid of the at least three elements, and
        identifying changes in distances of the positions of the elements to the centroid;
    and
    wherein controlling a change in the image displayed on the display device comprises:
        controlling translation of the three-dimensional graphical representation of the object along X and Y axes in accordance with movement of the centroid, and
        controlling movement of the three-dimensional graphical representation of the object along a Z axis as a function of the identified changes in distances of the positions of the elements to the centroid, the X, Y and Z axes being perpendicular to one another.

2. The method of claim 1, further comprising calculating a centroid of the object,
    wherein controlling translation of the three-dimensional graphical representation of the object comprises controlling the image so that the centroid of the object moves in accordance with movement of the centroid of the at least three elements.

3. The method of claim 1, wherein the Z axis is normal to a display surface of the display device.

4. A method of interfacing with a multi-point input device, comprising the steps of:
    displaying an image on a display device, the image corresponding to a three-dimensional graphical representation of an object;
    detecting positions of at least three elements that are simultaneously in contact with a multi-point input device;
    identifying a change in an attribute of the at least three elements;
    controlling a change in the image displayed on the display device in accordance with the identified change in the attribute of the at least three elements, and
    calculating a centroid of the at least three elements,
    wherein identifying a change in an attribute comprises:
        identifying-movement of the centroid of the at least three elements, and
        identifying changes in distances of the positions of the elements to the centroid;
    and
    wherein controlling a change in the image displayed on the display device comprises:
        controlling translation of the three-dimensional graphical representation of the object along X and Y axes in accordance with movement of the centroid, and controlling movement of the three-dimensional graphical representation of the object along a Z axis as a function of the identified changes in distances of the positions of the elements to the centroid, the X, Y and Z axes being perpendicular to one another.

5. A multi-point input system, comprising
a display device configured to display an image on a display surface, and detect positions of at least three elements that are simultaneously in contact with the display surface, the image corresponding to a three-dimensional graphical representation of an object; and
a controller configured to identify a change in an attribute of the at least three elements, and control a change in the image displayed on the display device in accordance with the identified change in the attribute of the at least three elements,
wherein the controller is further configured to:
   calculate a centroid of the at least three elements;
   identify a position and movement of the centroid of the at least three elements,
   identify changes in distances of the positions of the elements to the centroid;
   control translation as displayed on the display device of the three-dimensional graphical representation of the object along X and Y axes in accordance with movement of the centroid, and
   control movement of the three-dimensional graphical representation of the object along a Z axis as a function of the identified changes in distances of the positions of the elements to the centroid, the X, Y and Z axes being perpendicular to one another.

6. The multi-point input system of claim 5, wherein the Z axis is normal to the display surface of the display device.

7. A multi-point input system, comprising
a display device configured to display an image corresponding to a three-dimensional graphical representation of an object;
a multi-point input device having a contact surface, the multi-point input device adapted to detect positions of at least three elements that are simultaneously in contact with the contact surface; and
a controller configured to identify a change in an attribute of the at least three elements based on the detected positions of the elements contacting the contact surface, and control a change in the image displayed by the display device in accordance with the identified change in the attribute of the at least three elements,
wherein the controller is further configured to:
   calculate a centroid of the at least three elements;
   identify a position and movement of the centroid of the at least three elements,
   identify changes in distances of the positions of the elements to the centroid;
   control translation as displayed on the display device of the three-dimensional graphical representation of the object along X and Y axes in accordance with movement of the centroid, and
   control movement of the three-dimensional graphical representation of the object along a Z axis as a function of the identified changes in distances of the positions of the elements to the centroid, the X, Y and Z axes being perpendicular to one another.

8. The method of claim 4, wherein the Z axis is normal to a display surface of the display device.

9. The multi-point input system of claim 7, wherein the Z axis is normal to the display surface of the display device.

10. The method of claim 4, further comprising calculating a centroid of the object,
wherein controlling translation of the three-dimensional graphical representation of the object comprises controlling the image so that the centroid of the object moves in accordance with movement of the centroid of the at least three elements.

11. The multi-point input system of claim 5, wherein the controller is further configured to calculate a centroid of the object,
wherein the controller being configured to control translation of the three-dimensional graphical representation of the object comprises the controller being configured to control the image so that the centroid of the object moves in accordance with movement of the centroid of the at least three elements.

12. The multi-point input system of claim 7, wherein the controller is further configured to calculate a centroid of the object,
wherein the controller being configured to control translation of the three-dimensional graphical representation of the object comprises the controller being configured to control the image so that the centroid of the object moves in accordance with movement of the centroid of the at least three elements.

13. A multi-point input system, comprising
a display device configured to display an image on a display surface, and detect positions of at least three elements that are simultaneously in contact with the display surface, the image corresponding to a three-dimensional graphical representation of an object; and
a controller configured to identify a change in an attribute of the at least three elements, and control a change in the image displayed on the display device in accordance with the identified change in the attribute of the at least three elements, and calculate a centroid of the at least three elements,
wherein the controller includes means for:
   identifying a position and movement of the centroid of the at least three elements,
   identifying changes in distances of the positions of the elements to the centroid;
   controlling translation as displayed on the display device of the three-dimensional graphical representation of the object along X and Y axes in accordance with movement of the centroid, and
   controlling movement of the three-dimensional graphical representation of the object along a Z axis as a function of the identified changes in distances of the positions of the elements to the centroid, the X, Y and Z axes being perpendicular to one another.

14. A multi-point input system, comprising
a display device configured to display an image corresponding to a three-dimensional graphical representation of an object;
a multi-point input device having a contact surface, the multi-point input device adapted to detect positions of at least three elements that are simultaneously in contact with the contact surface; and
a controller configured to identify a change in an attribute of the at least three elements based on the detected positions of the elements contacting the contact surface, and control a change in the image displayed by the display device in accordance with the identified change in the attribute of the at least three elements, and calculate a centroid of the at least three elements, wherein the controller includes means for:
identifying a position and movement of the centroid of the at least three elements,
identifying changes in distances of the positions of the elements to the centroid;
controlling translation as displayed on the display device of the three-dimensional graphical representation of the object along X and Y axes in accordance with movement of the centroid, and
controlling movement of the three-dimensional graphical representation of the object along a Z axis as a function of the identified changes in distances of the positions of the elements to the centroid, the X, Y and Z axes being perpendicular to one another.

* * * * *